United States Patent
Rizvi et al.

(10) Patent No.: US 11,605,063 B2
(45) Date of Patent: Mar. 14, 2023

(54) POINT-OF-SALE DEVICE AND METHOD FOR GENERATING A DISCOUNTED AUTHORIZATION REQUEST

(71) Applicant: The Toronto-Dominion Bank, Toronto (CA)

(72) Inventors: Buturab Rizvi, Vaughan (CA); Alexandra Tsourkis, Toronto (CA); Ki Nam Choi, Markham (CA)

(73) Assignee: The Toronto-Dominoin Bank, Toronto (CA)

( * ) Notice: Subject to any disclaimer, the term of this patent is extended or adjusted under 35 U.S.C. 154(b) by 162 days.

(21) Appl. No.: 17/217,955

(22) Filed: Mar. 30, 2021

(65) Prior Publication Data

US 2021/0216987 A1  Jul. 15, 2021

Related U.S. Application Data (63) Continuation of application No. 16/572,518, filed on Sep. 16, 2019, now Pat. No. 10,990,947.

(51) Int. Cl.
*G06Q 20/20* (2012.01)
*G06Q 20/40* (2012.01)

(52) U.S. Cl.
CPC ..... *G06Q 20/202* (2013.01); *G06Q 20/40155* (2020.05)

(58) Field of Classification Search
CPC .............. G06Q 20/202; G06Q 20/40155
See application file for complete search history.

(56) References Cited

U.S. PATENT DOCUMENTS

| | | | | |
|---|---|---|---|---|
| 2003/0149662 A1* | 8/2003 | Shore | ..................... | G06Q 20/10 705/39 |
| 2005/0246292 A1* | 11/2005 | Sarcanin | ............... | G06Q 20/102 705/67 |
| 2016/0110715 A1* | 4/2016 | Murphy | ............... | G06Q 20/327 705/18 |
| 2016/0171486 A1* | 6/2016 | Wagner | ................ | G06Q 20/326 705/39 |

* cited by examiner

*Primary Examiner* — A. Hunter Wilder
(74) *Attorney, Agent, or Firm* — Graham Patent Law (57) ABSTRACT

A computer server receives from a mobile device, via a first network, a data structure request that includes a user identifier; associates a data structure with a user profile; and transmits the data structure to the mobile device. The user profile includes the user identifier and a current balance value. The server receives from a POS device, via a second network, a balance update request that includes an updated balance value, and a validation request that includes the user identifier and the data structure. The server determines that, prior to receiving the validation request, the server had associated the data structure with the user profile. The server replaces the current balance value in the user profile with the updated balance value; and transmits to the mobile device, via the first network, a balance update confirmation confirming that the server had updated the user profile with the updated balance value.

20 Claims, 5 Drawing Sheets

POINT-OF-SALE DEVICE AND METHOD FOR GENERATING A DISCOUNTED AUTHORIZATION REQUEST

RELATED APPLICATIONS

This patent application is a continuation patent application of U.S. patent application Ser. No. 16/572,518, filed Sep. 16, 2019, the contents of which are incorporated herein by reference.

FIELD

This patent application relates to a point-of-sale device and method for generating an authorization request and updating a user profile.

BACKGROUND

A customer may attempt to redeem an e-coupon by transmitting the e-coupon from the customer's mobile device to the merchant's point-of-sale (POS) device. Transmission of the e-coupon between the mobile device and the POS device may be frustrated by the lack of a cellular network connection to the mobile device at the merchant's premises.

A Bluetooth connection between the mobile device and the POS device may be time-consuming to establish. A merchant might make an open (i.e. not password protected) WiFi service available to its customers. However, such a service could expose, to rogue devices, sensitive customer data (e.g. e-mail passwords) that might be sent from other apps installed on the mobile device.

SUMMARY

This patent application describes a validation computer server, non-transitory computer-readable medium and associated method in which a mobile communications device communicates data structure requests to the validation computer server via a first communications network, and a point-of-sale device communicates balance update requests to the validation computer server via a second communications network.

In accordance with a first aspect of this disclosure, there is provided a validation server that includes a memory and a processing unit. The memory stores computer processing instructions, and the processing unit is coupled to the memory.

The processing instructions, when executed by the processing unit, cause the processing unit to receive from a mobile communications device, via a first communications network, a data structure request that includes a user identifier; associate a data structure with a user profile; and transmit the data structure to the mobile communications device. The user profile is stored in a user profile database and includes the user identifier and a current balance value.

The processing instructions cause the processing unit to receive a validation request and a balance update request from a point-of-sale device via a second communications network that is distinct from the first communications network. The validation request includes the user identifier and the data structure. The balance update request includes an updated balance value.

The processing instructions also cause the processing unit to validate the validation request by determining that, prior to receiving the validation request, the validation server had associated the data structure with the user profile.

After the processing unit validates the validation request, the processing instructions cause the processing unit to update the user profile by replacing the current balance value in the user profile with the updated balance value.

The processing unit then transmits to the mobile communications device, via the first communications network, a balance update confirmation that confirms that the validation server had updated the user profile with the updated balance value.

In accordance with a second aspect of this disclosure, there is provided a method of updating a user profile that involves a computer server receiving from a mobile communications device, via a first communications network, a data structure request that includes a user identifier.

The computer server associates a data structure with a user profile, and transmits the data structure to the mobile communications device. The user profile is stored in a user profile database and includes the user identifier and a current balance value.

The method also involves the computer server receiving a validation request and a balance update request from a point-of-sale device via a second communications network that is distinct from the first communications network. The validation request includes the user identifier and the data structure. The balance update request includes an updated balance value. The computer server validates the validation request by determining that, prior to receiving the validation request, the computer server had associated the data structure with the user profile.

After validating the validation request, the method further involves the computer server updating the user profile by replacing the current balance value in the user profile with the updated balance value. The computer server then transmits to the mobile communications device, via the first communications network, a balance update confirmation that confirms that the computer server had updated the user profile with the updated balance value.

In accordance with a third aspect of this disclosure, there is provided a non-transitory computer-readable medium that includes computer processing instructions stored thereon which, when executed by a processor of a computer server, cause the computer server to receive from a mobile communications device, via a first communications network, a data structure request that includes a user identifier; associate a data structure with a user profile; and transmit the data structure to the mobile communications device. The user profile is stored in a user profile database and includes the user identifier and a current balance value.

The processing instructions cause the computer server to receive a validation request and a balance update request from a point-of-sale device via a second communications network that is distinct from the first communications network. The validation request includes the user identifier and the data structure. The balance update request includes an updated balance value.

The processing instructions also cause the computer server to validate the validation request by determining that, prior to receiving the validation request, the computer server had associated the data structure with the user profile.

After the computer server validates the validation request, the processing instructions cause the computer server to update the user profile by replacing the current balance value in the user profile with the updated balance value. The computer server then transmits to the mobile communications device, via the first communications network, a balance update confirmation that confirms that the computer server had updated the user profile with the updated balance value.

In one implementation, the data structure request includes a merchant identifier, and the process of associating the data structure with the user profile involves the server:

generating a unique data structure identifier;
locating an e-coupon by querying an e-coupon database with the merchant identifier, the e-coupon storing the merchant identifier and an adjustment value;
determining the adjustment value from the located e-coupon;
incorporating the data structure identifier and the adjustment value into the data structure; and
saving the data structure identifier in the user profile database in association with the user identifier.

The process of associating the data structure with the user profile may also involve the server saving the merchant identifier in the user profile database in association with the data structure identifier and the user identifier. The process of validating the validation request may involve the server determining that, prior to receiving the validation request, the server had saved the merchant identifier and the data structure identifier in the user profile.

In one implementation, the server responds to the validation request by reading the current balance value from the user profile, and transmitting to the point-of-sale device a validation response that includes the current balance value and confirms that the server had validated the validation request.

In one implementation, the second communications network includes the point-of-sale device and the mobile communications device, and a network requirement of a physical data transmission layer of the first communications network is incompatible with a network requirement of a physical data transmission layer of the second communications network.

The process of transmitting the data structure may involve the server sending the data structure to the mobile communications device via the first communications network.

The process of transmitting the balance update confirmation may involve the server sending the balance update confirmation to the mobile communications device via the second communications network.

In one implementation, the point-of-sale device includes an input device, and the process of receiving a validation request may involve the point-of-sale device:

receiving a first authorization value from the input device;
receiving from the mobile communications device, via the second communications network, an adjustment request that includes the data structure and the user identifier, wherein the data structure includes an adjustment value and a data structure identifier;
recovering the adjustment value from the data structure;
generating a second authorization value from a difference between the first authorization value and the adjustment value; and
transmitting the validation request to the computer server via the first communications network, and transmitting to an authorization server over a payment network an authorization request message that includes the second authorization value.

The point-of-sale device may further include a computer-readable memory, and the process of receiving an adjustment request may involve the point-of-sale device:

generating a token, saving the token in the memory, and transmitting the token to the mobile communications device via the second communications network;
receiving the token from the mobile communications device via the second communications network, together with the data structure and the user identifier; and
confirming that, prior to receiving the token from the mobile communications device, the point-of-sale device had saved the token in the computer-readable memory.

BRIEF DESCRIPTION OF THE DRAWINGS

An exemplary point-of-sale device, validation computer server, non-transitory computer-readable medium, and method of updating a user profile will now be described, with reference to the accompanying drawings, in which.

DETAILED DESCRIPTION

Data Processing Network—Overview

Figure 1:
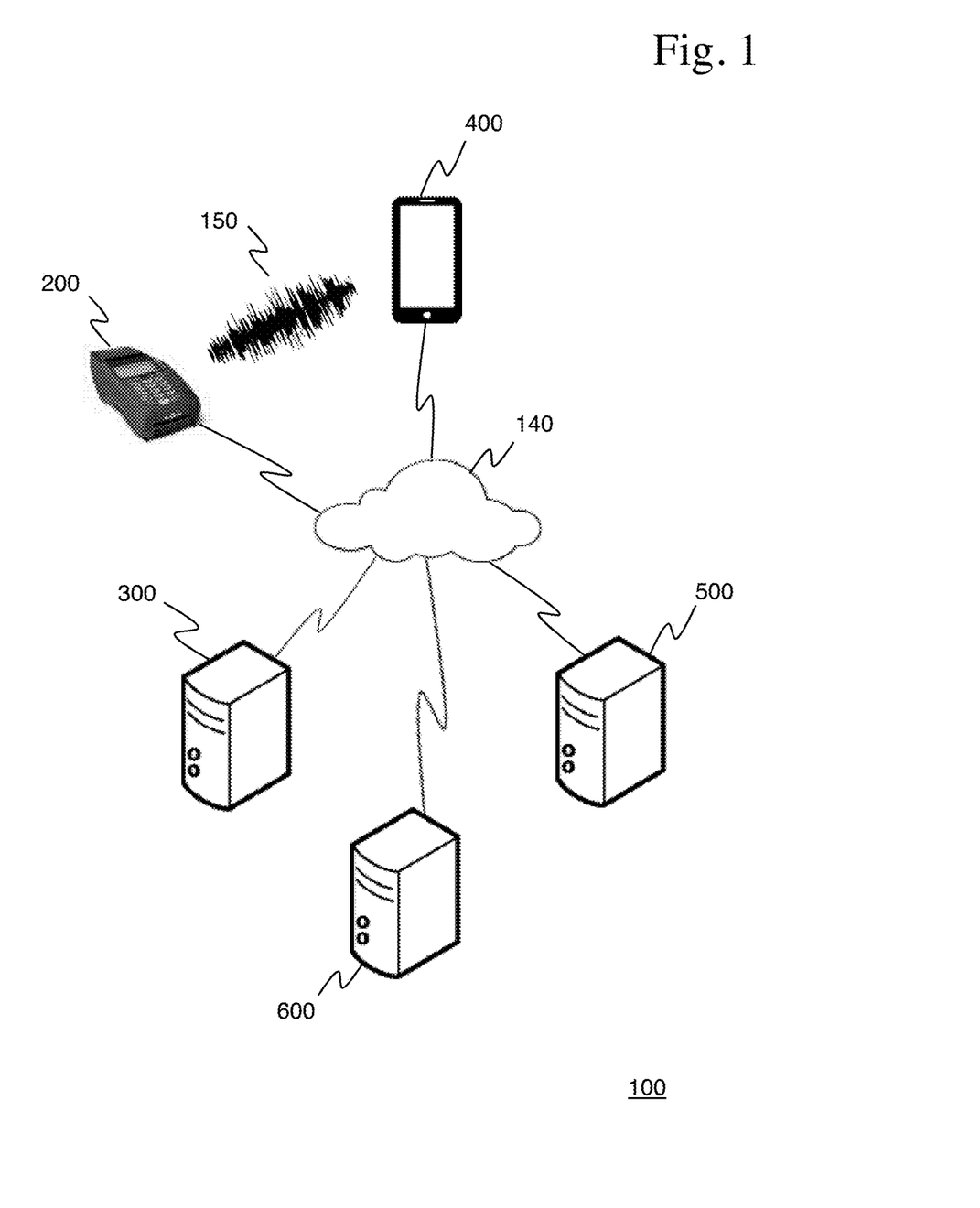
FIG. 1 is a schematic view of an exemplary data processing network, depicting a point-of-sale device, a validation computer server, and a mobile communications device.

FIG. 1 is a schematic view of a data processing network, denoted generally as 100. As shown, the data processing network 100 includes a point-of-sale (POS) device 200, a validation computer server 300, a mobile communications device 400, an acquirer computer server 500, and an authorization computer server 600.

The POS device 200 is configured to communicate with the validation computer server 300 and the acquirer computer server 500 via a wide area network 140. The POS device 200 is also configured to communicate with the mobile communications device 400 via a wireless local area network 150.

The validation computer server 300 is configured to communicate with the POS device 200 and the mobile communications device 400 via the wide area network 140. As will be discussed in greater detail, the validation computer server 300 maintains a user profile database that includes a plurality of records each associated with a respective user profile. The records of the user profile database may identify a user identifier that is uniquely associated with the user profile, a current balance value associated with the user profile, and a data structure identifier that is associated with the user identifier.

The mobile communications device 400 is configured to communicate with the POS device 200 via the wireless local area network 150. Additionally, the mobile communications device 400 is configured to communicate with the validation computer server 300 via the wide area network 140.

The acquirer computer server 500 is configured to communicate with the POS device 200 and the authorization computer server 600 via the wide area network 140. The acquirer computer server 500 is associated with a financial institution and maintains an accounts database that includes a plurality of a plurality of ledgers each associated with a respective account of a merchant customer ("merchant account") of the financial institution. Each ledger identifies at least an account number that is uniquely associated with the respective merchant account, and particulars of various payments made to the merchant account.

The authorization computer server 600 is configured to communicate with the acquirer computer server 500 via the wide area network 140. The authorization computer server 600 is associated with a financial institution and maintains an accounts database that includes a plurality of a plurality of ledgers each associated with a respective account of an end-user customer ("customer account") of the financial institution. Each ledger identifies at least a primary account number ("PAN") that is uniquely associated with the respective customer account, a set of authentication credentials that are uniquely associated with the customer account, an available credit value associated with the customer account, and particulars (e.g. merchant, authorization amount) of various transactions completed using the customer account. The financial institution associated with the authorization computer server 600 may also provide (or may authorize a third party to provide) payment cards to its customers. Each payment card is configured with at least the PAN of one of the customer's accounts.

Although the validation computer server 300 and the acquirer computer server 500 are depicted as distinct servers in FIG. 1, all or part of the functionality implemented by the validation computer server 300 may instead be implemented by the acquirer computer server 500. Further although the validation computer server 300 and the authorization computer server 600 are depicted as distinct servers in FIG. 1, all or part of the functionality implemented by the validation computer server 300 may instead be implemented by the authorization computer server 600.

The wide area network 140 includes a wired communications network and a mobile communications network. The wired communications network of the wide area network 140 is preferably implemented as an OSI-compliant network, and includes at least a physical communications layer that is responsible for the transmission of data across a physical transmission medium. As an example, the physical communications layer of the wired communications network may be IEEE 802.3 (i.e. Ethernet)-compliant.

The mobile communications network of the wide area network 140 is also preferably implemented as an OSI-compliant network, and includes at least a physical communications layer that is responsible for the long-range transmission of data across a wireless transmission medium. As an example, the physical communications layer of the wireless communications network may be LTE, WiMax, UMTS, CDMA and/or GSM-compliant. The mobile communications network typically includes at least one wireless base station subsystem (not shown) that communicates with the mobile communications device 400 via a wireless link, and acts as a bridge between the wireless links and the wired communications network.

The wide area network 140 also includes a payment network (e.g. VisaNet®, the Mastercard® Network, the Interac® Network) over which confidential payment information (e.g. payment card account numbers, payment card expiry dates) may be securely transmitted between the acquirer computer server 500 and the authorization computer server 600.

The wireless local area network 150 is preferably implemented as an OSI-compliant network, and includes at least a physical communications layer that is responsible for the short-range transmission of data across a wireless transmission medium. Preferably, the physical communications layer of the wireless local area network 150 implements a data-over-audio communications protocol that communicates data between devices using sonic or ultrasonic audio waves. Therefore, the physical network requirements of the physical data transmission layer of the local area network 150 are incompatible with the physical network requirements of the physical data transmission layer of the wide area network 140.

Point-of-Sale (POS) Device

The POS device 200 is typically associated with a merchant, and is deployed at the merchant's business premises. The POS device 200 may be implemented as an integrated point-of-sale (POS) terminal or as a semi-integrated point-of-sale (POS) terminal.

Figure 2:
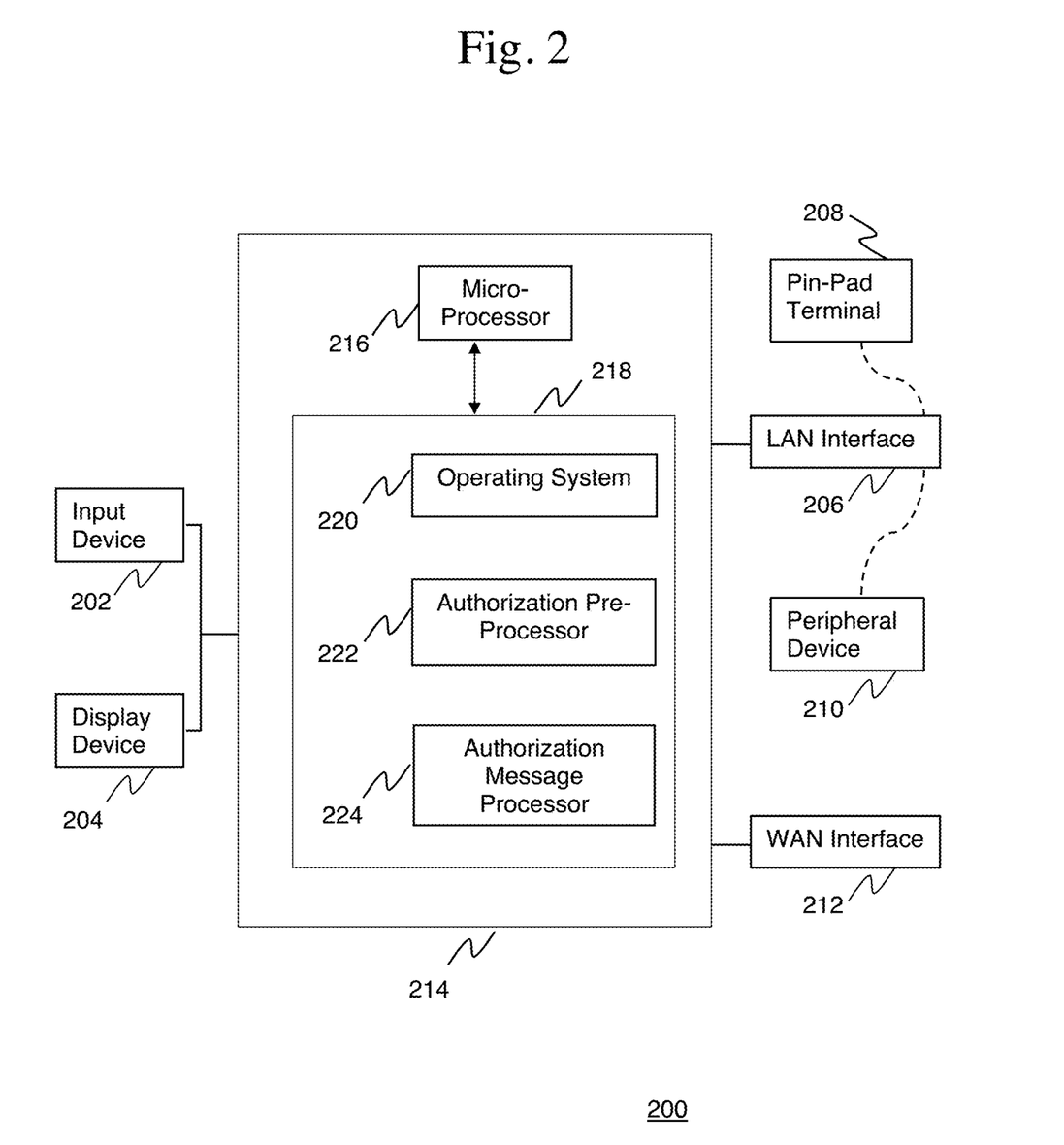
FIG. 2 is a schematic view of an exemplary point-of-sale device.

As shown in FIG. 2, the POS device 200 includes an input device 202, a display device 204, a local area network (LAN) interface 206, a pin-pad terminal 208, a peripheral device 210, a wide area network (WAN) interface 212, and a data processing system 214 that is in communication with the input device 202, the display device 204, the LAN interface 206 and the WAN interface 212. Although the pin-pad terminal 208 and the peripheral device 210 are depicted as distinct devices in FIG. 2, all or part of the functionality implemented by the pin-pad terminal 208 may instead be implemented by the peripheral device 210.

The input device 202 may be implemented as a keyboard, touchpad, touchscreen or other input device suitable for allowing the operator to input data and/or commands into the POS device 200. The display device 204 may be implemented as a liquid crystal display (LCD) panel, plasma display panel, or other display device suitable for displaying information to the operator of the POS device 200.

The LAN interface 206 may be configured as a wireless interface that allows the data processing system 214 to communicate directly with the pin-pad device 208 and/or the peripheral device 210 via a short-range wireless connection, such as a Bluetooth, or a Near Field Communications (NFC) connection, as examples. Alternately, or additionally, the LAN interface 206 may be configured as a wired interface that allows the data processing system 214 to communicate directly with the pin-pad device 208 and/or the peripheral device 210 via a wired connection, such as a Universal Serial Bus (USB) connection, as an example.

The pin-pad terminal 208 includes an input device (not shown), a display device (not shown) and a payment card interface (not shown) that is configured to communicate with a payment card (e.g. credit card, debit card). The payment card may be implemented as a plastic card that has a contact form factor and/or a contactless (e.g. ISO 14443 based) form factor. If the payment card has a contact form factor, the payment card interface may comprise a physical port (e.g. smartcard reader) that allows the pin-pad device 208 to communicate directly with the payment card. If the payment card has a contactless form factor, the payment card interface may comprise a wireless interface that allows the pin-pad terminal 208 to communicate with the payment card via a wireless protocol, such as ISO 14443.

The peripheral device 210 may be implemented as a mobile telephone or a wireless-enabled tablet computing device, as examples, and is configured for communication over the wireless local area network 150. As discussed above, the wireless local area network 150 implements a data-over-audio communications protocol. Therefore, the peripheral device 210 implements a data-over-audio physical communications layer that is configured for communication with devices (e.g. the mobile communications device 400) on the wireless local area network 150 via the data-over-audio communications protocol. The peripheral device 210 is coupled to the data processing system 214 via the LAN interface 206 and thereby allows the POS device 200 to indirectly communicate with the mobile communications device 400 (via the peripheral device 210).

The WAN interface 212 interfaces the POS device 200 with the wide area network 140, and allows the POS device 200 to communicate with the validation computer server 300 and the acquirer computer server 500 via the wide area network 140.

The data processing system 214 includes a microprocessor 216 and a non-transient computer-readable medium 218. The non-transient computer-readable medium 218 may be implemented as a non-volatile electronic computer memory (e.g. FLASH memory), as an example. The financial institution associated with the acquirer computer server 500 may assign each merchant a unique merchant identifier, and the non-transient computer-readable medium (memory) 218 may store the merchant identifier that is uniquely associated with the merchant.

The memory 218 may also store computer processing instructions which, when accessed from the memory 218 and executed by the microprocessor 216, implement at least an operating system 220, an authorization pre-processor 222, and an authorization message processor 224.

The operating system 220 allows the POS device 200 to accept user input from the input device 202 and to display information on the display device 204. The operating system 220 also allows the POS device 200 to communicate with the pin-pad device 208 and the peripheral device 210 via the LAN interface 206, and to communicate with the validation computer server 300 via the wide area network 140. The operating system 220 also allows the POS device 200 to securely transmit/receive confidential payment information (e.g. authorization requests, authorization responses) to/from the acquirer computer server 500 via the WAN interface 212.

The merchant may use the POS device 200 to initiate a transaction with a customer by, for example, inputting a first authorization value into the POS device 200 via the input device 202. The customer may initiate payment for the transaction by providing the POS device 200 (via the peripheral device 210 and the local area network 150) with an adjustment request message that includes (a) a user identifier that is uniquely associated with the customer, and (b) a data structure that includes at least (i) an adjustment value and (ii) a data structure identifier that uniquely identifies the data structure. The data structure may optionally also include a weight factor which the authorization pre-processor 222 may use to generate a second authorization value.

As discussed, the peripheral device 210 implements a data-over-audio physical communications layer. Therefore, the peripheral device 210 receives the adjustment request message from the mobile communications device 400 via a data-over-audio communications protocol, and provides the POS device 200 with the adjustment request message via the LAN interface 206.

The POS device 200 may receive the adjustment request message from the mobile communications device 400, and the authorization pre-processor 222 may be configured to respond to the adjustment request message by, for example, (i) saving the data structure in the memory 218 of the POS device 200, and (ii) transmitting to the validation computer server 300 (via the wide area network 140) a validation request message that includes the data structure and the user identifier.

As discussed above, the validation computer server 300 maintains a user profile database that includes a plurality of records each associated with a respective user profile. Each record may identify at least a user identifier that is uniquely associated with the user profile, a current balance value associated with the user profile, and a data structure identifier that is associated with the user identifier. In response to the validation request message, the POS device 200 may receive, from the validation computer server 300 (via the wide area network 140), a validation response message that confirms that, before the validation computer server 300 received the validation request message from the POS device 200, the validation computer server 300 had saved the data structure identifier of the data structure in the user profile database in association with the user identifier. The authorization pre-processor 222 may be configured to respond to the validation response message by, for example, (i) recovering the adjustment value from the data structure saved in the memory 218 of the POS device 200, (ii) generating a second authorization value from the difference between the first authorization value and the recovered adjustment value (i.e. subtracting the adjustment value from the first authorization value), and (iii) providing the authorization message processor 224 with the second authorization value.

In one variation, the adjustment request message includes the merchant identifier, and the POS device 200 may receive from the validation computer server 300 (in response to the validation request message) a validation response message that confirms that, before the validation computer server 300 received the validation request message from the POS device 200, the validation computer server 300 had saved the data structure identifier of the data structure in the user profile database in association with the user identifier and the merchant identifier.

The authorization message processor 224 may be configured to respond to the second authorization value by prompting the customer to interface a payment card with the payment card interface of the pin-pad terminal 208. The customer may interface a payment card with the pin-pad terminal 208, and the pin-pad terminal 208 may use the payment card interface to read account particulars (e.g. primary account number ("PAN"), card expiration date) from the payment card, and may notify the authorization message processor 224 of the account particulars.

The authorization message processor 224 may be configured to respond to the account particulars by, for example, (i) generating an authorization request message from the second authorization value (i.e. the authorization request message includes at least the account particulars and the second authorization value) and (ii) transmitting the authorization request message to the authorization computer server 600 (via the payment network of the wide area network 140).

As discussed above, the authorization computer server 600 maintains an accounts database that includes a plurality of a plurality of ledgers each associated with a respective customer account. Each ledger identifies at least the account number of the respective customer account, and the credit available in the customer account. In response to the authorization request message, the POS device 200 may receive, from the authorization computer server 600 (via the wide area network 140), an authorization response message that indicates whether the credit available in the customer account associated with the PAN is at least equal to the second authorization value (i.e. indicating whether the transaction was authorized). The authorization message processor 224 may be configured to respond to the authorization response message by, for example, displaying a message on the display device 204 of the POS device 200 indicating whether the transaction was authorized.

In one variation, the validation response message includes the current balance value that is associated with the user profile, and the authorization message processor 224 may provide the authorization pre-processor 222 with the authorization response message. Alternately, the validation response message may include the current balance value (merchant-specific current balance value) that is associated with the user profile and the merchant. In these variations, the authorization pre-processor 222 is configured to respond to the validation response message (and the authorization response message) by, for example, (i) optionally confirming from the authorization response message that the transaction was authorized, (ii) generating an updated balance value from the second authorization value and the current balance value (merchant-specific current balance value), (iii) transmitting to the validation computer server 300, via the WAN interface 212, a balance update request that includes the user identifier and the updated balance value, and (iv) receiving from the validation computer server 300, via the WAN interface 212, a balance update confirmation that confirms that the validation computer server 300 replaced the current balance value (merchant-specific current balance value) in the user profile with the updated balance value.

In these variations, the authorization pre-processor 222 may be configured to generate the updated balance value by, for example, multiplying the second authorization value by a weight factor (included, for example, in the data structure or otherwise stored in the memory 218), and adding the resulting product to the current balance value (merchant-specific current balance value). The authorization pre-processor 222 may also be configured to respond to the validation response message (and the authorization response message) by, for example, transmitting the updated balance value to the mobile communications device 400 via the LAN interface 206 (and the peripheral device 210). As discussed, the peripheral device 210 implements a data-over-audio physical communications layer. Therefore, the peripheral device 210 receives the updated balance value from the POS device 200 via the LAN interface 206, and provides the mobile communications device 400 with the updated balance value via a data-over-audio communications protocol.

As discussed, the merchant may use the POS device 200 to initiate a transaction with a customer by, for example, inputting the first authorization value into the POS device 200 via the input device 202. In one variation, before the mobile communications device 400 transmits the adjustment request to the POS device 200, the customer advises the merchant that the customer intends to pay the first authorization value (in whole or in part) by providing the merchant with an adjustment request from the customer's mobile communications device 400. In response, the merchant may use the input device 202 to command the POS device 200 to securely receive the adjustment request from the mobile communications device 400.

In this variation, the authorization pre-processor 222 is configured to securely receive the adjustment request by, for example, (i) generating a token, (ii) saving the token in the memory 218 of the POS device 200, (iii) via the LAN interface 206 (and the peripheral device 210), transmitting the token to the mobile communications device 400, and (iv) via the LAN interface 206 (and the peripheral device 210), receiving the token from the mobile communications device 400, together with the data structure and the user identifier. The token may be pseudo-random number, and the authorization pre-processor 222 may include a pseudo-random number generator for generating the token.

The authorization pre-processor 222 is configured to respond to the adjustment request by, for example, (i) validating the token by confirming that, before the POS device 200 received the token from the mobile communications device 400, the authorization pre-processor 222 had saved the token in the memory 218, and (ii) erasing the token from the memory 218.

As discussed, the peripheral device 210 implements a data-over-audio physical communications layer. Therefore, the peripheral device 210 receives the token from the POS device 200 via the LAN interface 206, and provides the mobile communications device 400 with the token via a data-over-audio communications protocol. The peripheral device 210 also receives the token, data structure and user identifier from the mobile communications device 400 via a data-over-audio communications protocol, and provides the POS device 200 with the token, data structure and user identifier via the LAN interface 206.

In this variation, the authorization pre-processor 222 may be configured to save the token by storing the token in the memory 218 in association with a time-stamp of a current time. The authorization pre-processor 222 may also be configured to validate the token by, for example, (i) locating the time-stamp that is associated with the token in the memory 218, and (ii) confirming that a difference between the current time and the located time-stamp does not exceed a predetermined limit (i.e. confirming from the located time-stamp that the token has not expired).

Validation Computer Server

Figure 3:
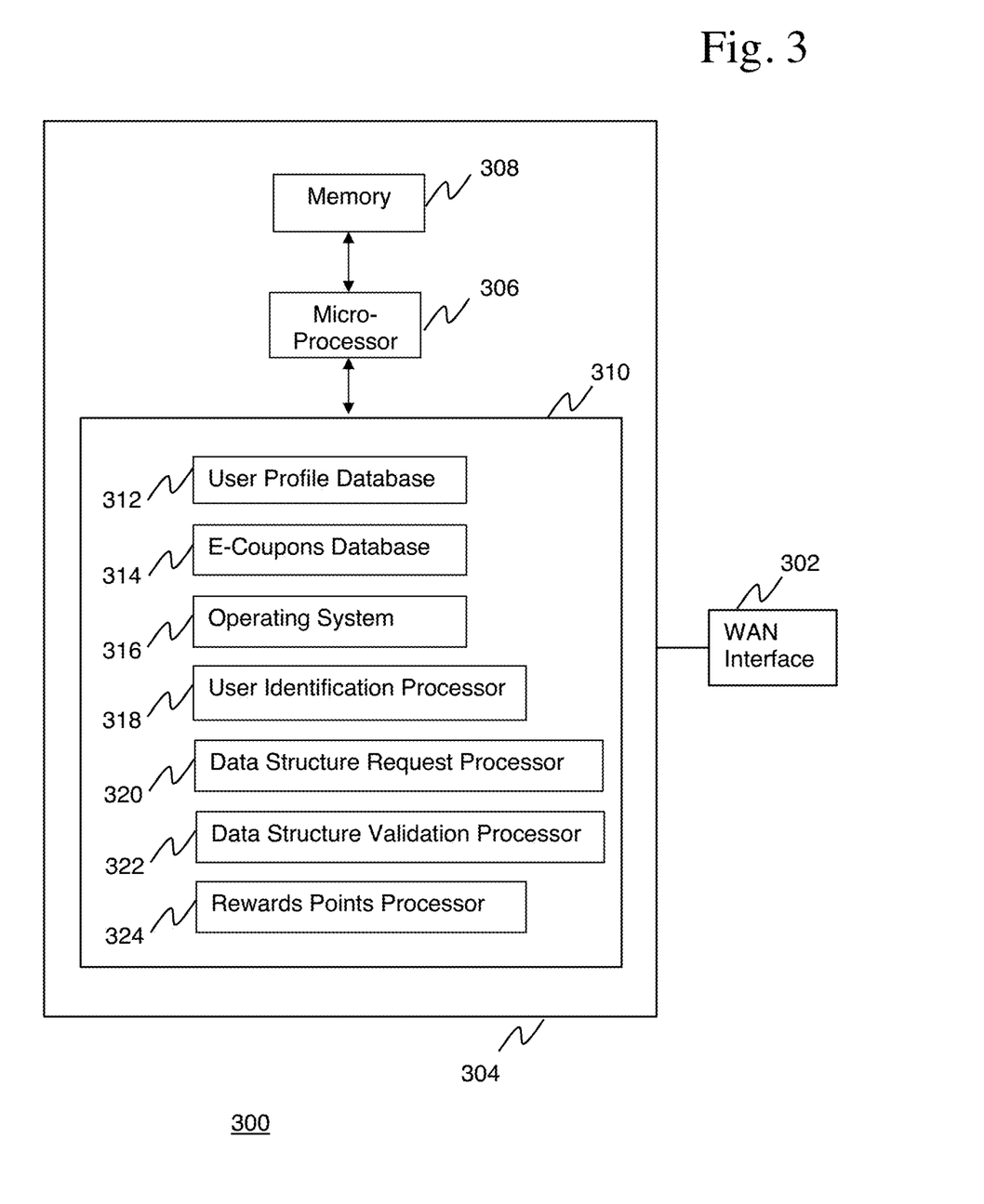
FIG. 3 is a schematic view of an exemplary validation computer server.

As shown in FIG. 3, the validation computer server 300 includes a wide area network (WAN) interface 302, and a data processing system 304 that is in communication with the WAN interface 302. The WAN interface 302 interfaces the validation computer server 300 with the wide area network 140, and allows the validation computer server 300 to communicate with the POS device 200 and the mobile communications device 400 via the wide area network 140.

The data processing system 304 includes one or more microprocessors 306, a volatile computer-readable memory 308 and a non-transient computer-readable medium 310. The non-transient computer-readable medium 310 may be provided as one or more of a magnetic storage drive and a solid-state drive.

The computer-readable medium 310 may store a user profile database 312, and an e-coupons database 314. The user profile database 312 includes a plurality of records each associated with a respective user profile. Each record of the user profile database 312 identifies a user identifier that is uniquely associated with the user profile, a current balance value that is associated with the user profile, and a data structure identifier (if any) that is associated with the user identifier.

The e-coupons database 314 may store e-coupons that identify promotions (i.e. discounts) available to consumers on various goods and/or services. Each e-coupon may include a product code (e.g. UPC) of a good or service, an adjustment (discount) amount available on the purchase of the good or service during the promotion, and optionally also the merchant identifier of a merchant that is participating in the promotion. The business entity associated with the validation computer server 300 may periodically receive the e-coupons from various distributors, and the validation computer server 300 may periodically update the e-coupons database 314 with the received e-coupons.

The computer-readable medium 310 may also store computer processing instructions which, when copied into the volatile computer-readable memory 308, and executed by the microprocessor(s) 306 from the volatile computer-readable memory 308, implement at least an operating system 316, a user identifier processor 318, a data structure request processor 320, a data structure validation processor 322, and a rewards points processor 324.

The operating system 316 allows the validation computer server 300 to at least communicate with the POS device 200 and the mobile communications device 400 (via the WAN interface 302).

The user identifier processor 318 provides customers with unique user identifiers, to thereby allow customers to request data structures from the validation computer server 300. A user of a mobile communications device 400 may use the mobile communications device 400 to establish a communication session to with the validation computer server 300, and transmit to the validation computer server 300 a user identifier request that requests a unique user identifier from the validation computer server 300. As discussed above, the authorization computer server 600 maintains an accounts database that includes a plurality of a plurality of ledgers each associated with a respective customer account. Each ledger identifies at least a set of authentication credentials that are uniquely associated with the customer account. Therefore, the user identifier processor 318 may be configured to redirect the communication session to the authorization computer server 600, in response to the user identifier request.

In response to the user identifier request, the authorization computer server 600 may request that the mobile device user authenticate to the authorization computer server 600. The mobile device user may authenticate to the authorization computer server 600 by, for example, using the mobile communications device 400 to provide the authorization computer server 600 with a set of authentication credentials, and the authorization computer server 600 may authenticate the mobile device user by confirming that the set of authentication credentials received from the mobile communications device 400 correspond to a set of authentication credentials stored in the accounts database.

After the mobile device user successfully authenticates to the authorization computer server 600, the authorization computer server 600 may redirect the communications session back to the validation computer server 300, and notify the validation computer server 300 that the mobile device user has been successfully authenticated. The user identifier processor 318 may be configured to (in response to the authentication confirmation message from the authorization computer server 600) (i) generate a unique user identifier (for example, using a pseudo-random number/character generator), (ii) establish in the user profile database 312 a user profile that includes the unique user identifier and a current balance value (initially set to zero), and (iii) provide the mobile communications device 400 with the unique user identifier. The user identifier processor 318 may ensure that each user identifier is unique by saving each new user identifier in the user profile database 312 only after confirming that the user identifier processor 318 had not previously saved the user identifier in the user profile database 312.

The data structure request processor 320 provides customers with data structures to thereby allow the customers to request adjustments to the first authorization value input into the POS device 200. After the mobile communications device 400 receives the unique user identifier from the validation computer server 300, the user of the mobile communications device 400 may request a data structure from the validation computer server 300 by, for example, using the mobile communications device 400 to transmit to the validation computer server 300 (via the wide area network 140) a data structure request message that includes at least the user identifier. The data structure request processor 320 may be configured to (in response to the data structure request message) (i) generate one or more data structures, (ii) associate the data structure(s) with the mobile device user, and (iii) provide the mobile communications device 400 with the data structure(s).

As discussed above, each data structure includes at least (i) an adjustment value and (ii) a data structure identifier that uniquely identifies the data structure. The data structure request processor 320 may be configured to generate the data structures by (i) reading the adjustment value and product code from each e-coupon stored in the e-coupons database 314 and, for each e-coupon, (ii) generating a unique data structure identifier (for example, using a pseudo-random number/character generator), and generating a data structure that includes the unique data structure identifier, and the adjustment value and product code read from the e-coupon. The validation computer server 300 may also be configured with an asymmetric cryptographic key pair. In order to facilitate subsequent validation of the data structure, the data structure request processor 320 may optionally be configured to digitally sign each data structure with the private cryptographic key of the asymmetric cryptographic key pair.

The data structure request processor 320 may be configured to associate each data structure with the mobile device user by saving the associated data structure identifier in the user's profile in the user profile database 312, in association with the user identifier. The data structure request processor 320 may ensure that each data structure identifier is unique by saving each new data structure identifier in the user profile database 312 only after confirming that the data structure request processor 320 had not previously saved the data structure identifier in the user profile database 312.

In one variation, the data structure request message also includes a merchant identifier that is uniquely associated with the merchant, and the merchant may provide its customers with the merchant identifier by, for example, displaying the merchant identifier at the merchant's business premises. The user of the mobile communications device 400 may manually enter the merchant identifier into the mobile communications device 400. Alternately, the merchant may display the merchant identifier as a bar code (e.g. QR-code), and the user of the mobile communications device 400 may enter the merchant identifier into the mobile communications device 400 by scanning the bar code with the mobile communications device 400.

In this variation, the data structure request processor 320 may be configured to generate the data structures by (i) locating e-coupons for which the merchant is participating in the promotion, by querying the e-coupons database 314 with the received merchant identifier, (ii) reading the adjustment value and product code from each located e-coupon and, for each located e-coupon, (iii) generating a unique data structure identifier (for example, using a pseudo-random number/character generator) and generating a data structure that includes the unique data structure identifier, the merchant identifier, and the adjustment value and product code read from the located e-coupon.

In this variation, the data structure request processor 320 may be configured to associate each data structure with the mobile device user and the merchant by saving the data structure identifier in the user's profile in the user profile database 312, in association with the user identifier and the merchant identifier. The data structure request processor 320 may also determine whether the user's profile includes a current balance value (merchant-specific current balance value) that is associated with the merchant. If the user's profile does not include a merchant-specific current balance value, the validation computer server 300 may establish in the user's profile a merchant-specific current balance value (initially set to zero).

The data structure validation processor 322 validates data structures received from the POS device 200. As discussed above, a customer may initiate payment for a transaction by providing the POS device 200 with an adjustment request message that includes a user identifier and a data structure. The POS device 200 may transmit to the validation computer server 300 (via the wide area network 140) a validation request message that includes the data structure and the user identifier. The data structure validation processor 322 may be configured to respond to the validation request message by, for example, (i) querying the user profile database 312 with the received user identifier to locate a database record that includes the user identifier (i.e. locating the user profile that includes the user identifier), (ii) reading the data structure identifier from the data structure, (iii) determining from the located user profile whether the data structure identifier was saved in the user profile database 312 in association with the user identifier, and (iv) transmitting to the POS device (via the WAN interface 302) a validation response message that indicates whether, before the validation computer server 300 received the validation request message from the POS device 200, the validation computer server 300 had saved the data structure identifier in the user profile database 312 in association with the user identifier.

As discussed above, in one variation, the validation request message includes a merchant identifier. In this variation, the data structure validation processor 322 may be configured to respond to the validation request message by, for example, (i) querying the user profile database 312 with the received user identifier to locate a database record that includes the user identifier (i.e. locating the user profile that includes the user identifier), (ii) reading the data structure identifier from the data structure, (iii) determining from the located user profile whether the data structure identifier was saved in the user profile database 312 in association with the user identifier and the merchant identifier, and (iv) transmitting to the POS device (via the WAN interface 302) a validation response message that indicates whether, before the validation computer server 300 received the validation request message from the POS device 200, the validation computer server 300 had saved the data structure identifier in the user profile database 312 in association with the user identifier and the merchant identifier.

In one variation, the validation response message includes the current balance value (merchant-specific current balance value) that is saved in the user's profile in the user profile database 312 in association with the user identifier. In this variation, the data structure validation processor 322 is further configured to respond to the validation request message by determining the current balance value (merchant-specific current balance value) from the located database record, and incorporating the determined current balance value (merchant-specific current balance value) into the validation response message.

As discussed above, in response to the validation response message the POS device 200 may generate an updated balance value from the second authorization value and the current balance value (merchant-specific current balance value), and transmit to the validation computer server 300 a balance update request that includes the user identifier and the updated balance value. The rewards points processor 324 may be configured to respond to the balance update request by, for example, (i) querying the user profile database 312 with the received user identifier to locate a database record that includes the user identifier (i.e. locating the user profile that includes the user identifier), (ii) replacing the current balance value (merchant-specific current balance value) in the user's profile with the updated balance value, and (iii) transmitting to the POS device (via the WAN interface 302) a balance update confirmation that confirms that the validation computer server 300 has replaced the current balance value in the user profile with the updated balance value.

Mobile Communications Device

Figure 4:
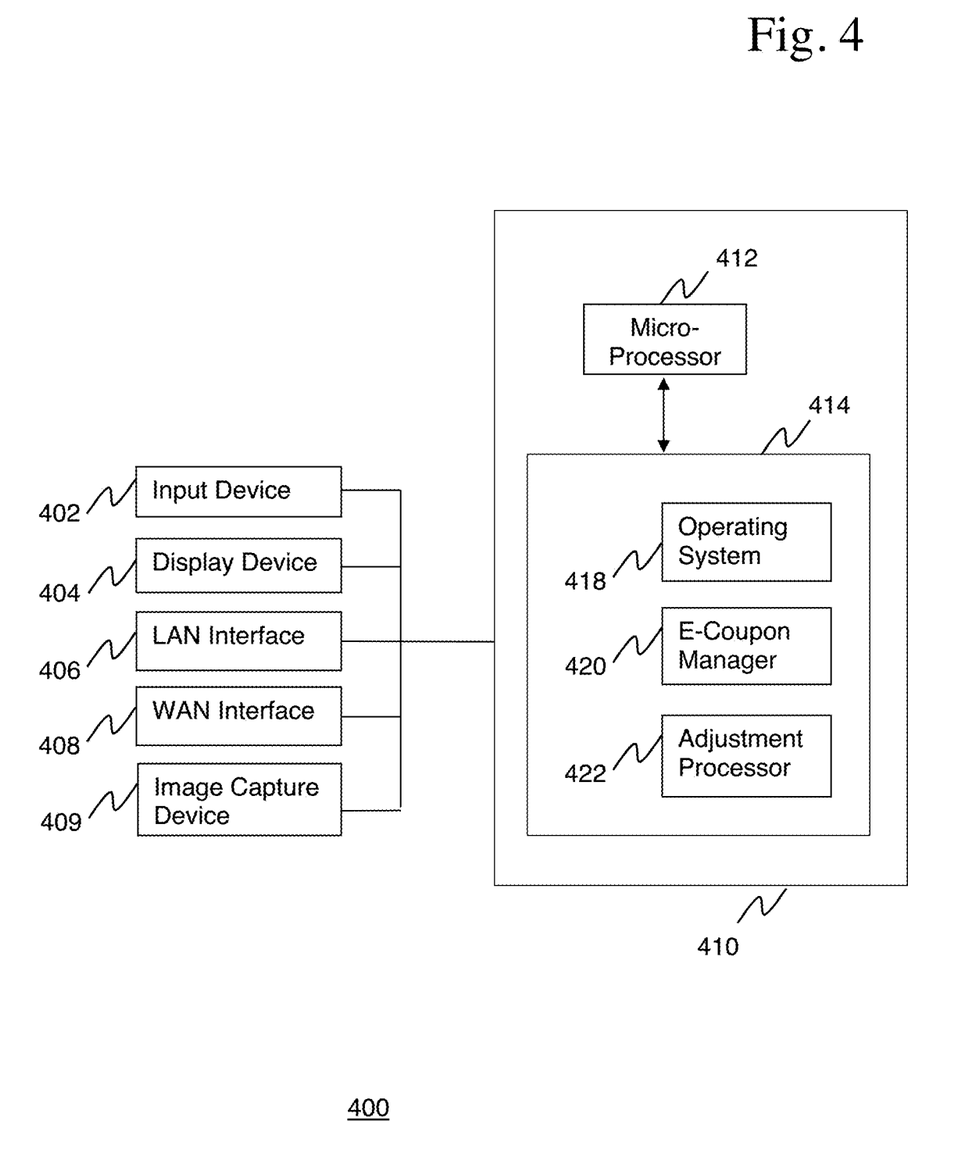
FIG. 4 is a schematic view of an exemplary mobile communications device.

The mobile communications device 400 is typically implemented as a wireless communications device, such as a portable digital assistant (PDA), a tablet computer or a smartphone. As shown in FIG. 4, the mobile communications device 400 may include an input device 402, a display device 404, a local area network (LAN) interface 406, a wide area network (WAN) interface 408, an image capture device (e.g. CCD image sensor) 409, and a data processing system 410 that is in communication with the input device 402, the display device 404, the LAN interface 406, the WAN interface 408, and the image capture device 409.

The input device 402 may be implemented as a keyboard, touchpad, touchscreen or other input device suitable for allowing the operator to input data and/or commands into the mobile communications device 400. The display device 404 may be implemented as a liquid crystal display (LCD) panel, plasma display panel, or other display device suitable for displaying information to the operator of the mobile communications device 400.

The LAN interface 406 interfaces the mobile communications device 400 with the wireless local area network 150. As discussed above, the wireless local area network 150 implements a data-over-audio communications protocol. Therefore, the LAN interface 406 implements a data-over-audio physical communications layer that is configured for communication with devices (e.g. the peripheral device 210) on the wireless local area network 150 via the data-over-audio communications protocol.

The WAN interface 408 interfaces the mobile communications device 400 with the mobile communications network of the wide area network 140, and allows the mobile communications device 400 to communicate with the validation computer server 300 via the wide area network 140.

The data processing system 410 includes a microprocessor 412 and a non-transient computer-readable medium 414. The non-transient computer-readable medium 414 may be provided as non-volatile electronic computer memory (e.g. FLASH memory), as an example. The non-transient computer-readable medium (memory) 414 may store computer processing instructions which, when accessed from the memory 414 and executed by the microprocessor 412, implement at least an operating system 418, an e-coupon manager 420 and an adjustment processor 422.

The operating system 418 allows the mobile communications device 400 to accept user input from the input device 402 and to display information on the display device 404. The operating system 418 also allows the mobile communications device 400 to communicate with the peripheral device 210 via the LAN interface 406, and to communicate with the validation computer server 300 via the WAN interface 408.

The e-coupon manager 420 is configured to (i) transmit a user identifier request to the validation computer server 300 via the WAN interface 408, (ii) receive a unique user identifier from the validation computer server 300 via the WAN interface 408, and (iii) save the received user identifier in the memory 414. The e-coupon manager 420 is also configured to (iv) transmit to the validation computer server 300, via the WAN interface 408, a data structure request that includes the user identifier, (v) receive one or more data structure(s) from the validation computer server 300 via the WAN interface 408, and (vi) save the received data structure(s) in the memory 414.

As discussed above, the data structure(s) each include at least (i) an adjustment value and (ii) a data structure identifier that uniquely identifies the data structure. The adjustment processor 422 may be configured to (i) display on the display device 404 the data structure(s) that are stored in the memory 414, (ii) receive from the input device 202 a selection of one of the displayed data structures, (iii) generate an adjustment request message that includes the user identifier and the selected data structure, and (iv) transmit the adjustment request message to the peripheral device 210 via the LAN interface 406.

In one variation, one or more of the data structures stored in the memory 414 also include the merchant identifier of a participating merchant. In this variation, the adjustment processor 422 is configured to (i) read a merchant identifier from the input device 402 or the image capture device 409, (ii) locate in the memory 414 the data structure(s) (if any) that include the merchant identifier (as read from the input device 402 or image capture device 409), (iii) display the located data structure(s) on the display device 404, (iv) receive from the input device 202 a selection of one of the displayed data structures, (v) generate an adjustment request message that includes the user identifier and the selected data structure, and (vi) transmit the adjustment request message to the peripheral device 210 via the LAN interface 406.

As discussed above, in one variation the POS device 200 transmits a token to the mobile communications device 400 via the wide area network 140. In this variation, the adjustment processor 422 is configured to incorporate the token into the adjustment request message.

Method of Updating a User Profile

Figure 5:
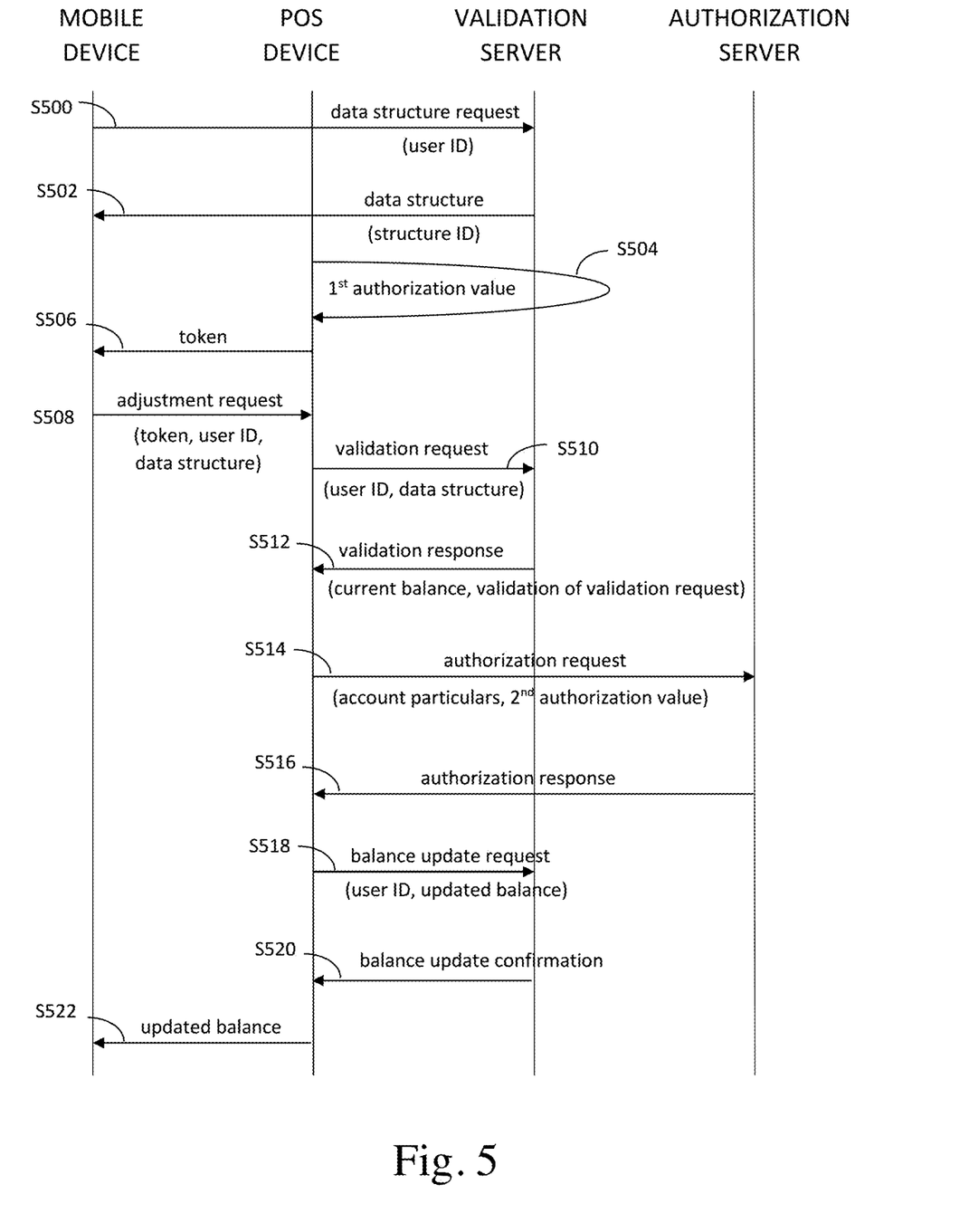
FIG. 5 is a message flow diagram that depicts an exemplary method of updating a user profile.

As discussed, the data processing network 100 implements a method of updating a user profile. A sample embodiment of the discounting method will be discussed with reference to FIGS. 5a and 5b. As will be explained, in this embodiment, the POS device 200 receives a first authorization value from an input device of the POS device 200, and receives from a mobile communications device, via a local area network 150, an adjustment request that includes a data structure and a user identifier. The data structure includes an adjustment value and a data structure identifier.

The POS device 200 responds to the adjustment request by (i) saving the data structure in the memory of the POS device 200, and (ii) transmitting to the validation computer server 300, via a wide area network 140 (which is distinct from the local area network 150), a validation request that includes the data structure and the user identifier.

The wide area network 140 and the local area network 150 each include a respective physical data transmission layer, and the network requirements of the physical data transmission layer of the wide area network 140 are incompatible with network requirements of the physical data transmission layer of the local area network 150.

The POS device 200 receives from the validation computer server 300, via the wide area network 140, a validation response in response to the validation request. The validation response provides confirmation that, prior to receiving the validation request, the validation computer server 300 had saved the data structure identifier of the data structure in a user profile database in association with the user identifier.

The POS device 200 responds to the validation response by (i) recovering the adjustment value from the data structure saved in the memory, (ii) generating a second authorization value from the difference between the first authorization value and the adjustment value, and (iii) transmitting to the authorization server 600, over a payment network, an authorization request message that includes the second authorization value.

An example method of updating a user profile will now be discussed in detail with reference to FIG. 5. In the following example, a merchant is in possession of a POS device 200, and a prospective customer of the merchant is in possession of a mobile communications device 400.

The POS device 200 (or the peripheral device 210 of the POS device) and the mobile communications device 400 are configured for communications with one another via a data-over-audio communications protocol. The mobile communications device 400 stores a user identifier that is uniquely associated with the customer, and the validation computer server 300 maintains a user profile that includes the user identifier and a current balance value.

The financial institution associated with the acquirer computer server 500 maintains a merchant account for the merchant, and the financial institution associated with the authorization server 600 maintains a customer account for the customer.

(i) Download Data Structures

Prior to attending at the premises of the merchant, the customer may download one or more data structures to the mobile communications device 400. The customer initiates the data structure(s) download, at step S500, by using the mobile communications device 400 to transmit a data structure request message from the mobile communications device 400 to the validation computer server 300 (via the mobile communications network of the wide area network 140). The data structure request message includes the user identifier that is stored in the memory 414 of the mobile communications device 400, and the mobile communications device 400 transmits the data structure request message when the mobile communications device 400 has connectivity with the mobile communications network of the wide area network 140.

In response to the data structure request message, the validation computer server 300 may generate one or more data structures by (i) reading the adjustment value and product code from each e-coupon stored in the e-coupons database 314 and, for each e-coupon, (ii) generating a unique data structure identifier, and generating a data structure that includes the unique data structure identifier, and the adjustment value and product code read from the e-coupon. The validation computer server 300 may then associate the data structure(s) with the customer by saving the data structure identifier of each data structure in the user's profile in the user profile database 312, in association with the user identifier.

After the validation computer server 300 associates the data structure(s) with the customer, at step S502 the validation computer server 300 transmits the data structure(s) to the mobile communications device 400 (via the mobile communications network of the wide area network 140), in response to the data structure request message. The mobile communications device 400 then stores the received data structure(s) in the memory 414 of the mobile communications device 400. Since the mobile communications device 400 transmits the data structure request message and receives the data structure(s) via the mobile communications network, the mobile communications device 400 transmits the data structure request message to validation computer server 300 (and receives the data structure(s) from the validation computer server 300) when the mobile communications device 400 has connectivity with the mobile communications network.

In one variation, the customer may initiate the data structure(s) download while the customer is in attendance at the premises of the merchant. In this variation, the merchant may display a merchant identifier at the merchant's premises, and the customer may use the input device 402 or the image capture device 409 of the mobile communications device 400 to input the merchant identifier into the memory 414 of the mobile communications device 400. At step s500, the customer may then use the mobile communications device 400 to transmit a data structure request message from the mobile communications device 400 to the validation computer server 300 (via the mobile communications network of the wide area network 140). In this variation, the data structure request message includes the user identifier and the merchant identifier.

In this variation, in response to the data structure request message, the validation computer server 300 may generate one or more data structures by (i) querying the e-coupons database 314 with the received merchant identifier to thereby locate e-coupons for which the merchant is participating in the promotion, (ii) reading the adjustment value and product code from each located e-coupon and, for each located e-coupon, (iii) generating a unique data structure identifier, and generating a data structure that includes the unique data structure identifier, the merchant identifier, and the adjustment value and product code read from the located e-coupon. The validation computer server 300 may then associate the data structure(s) with the customer by saving the data structure identifier of each data structure in the user's profile in the user profile database 312, in association with the user identifier and the merchant identifier.

As above, at step S502 the validation computer server 300 may then transmit the data structure(s) to the mobile communications device 400 (via the mobile communications network of the wide area network 140), in response to the data structure request message. The mobile communications device 400 may then store the received data structure(s) in the memory 414 of the mobile communications device 400. Further, as above, since the mobile communications device 400 transmits the data structure request message and receives the data structure(s) via the mobile communications network, the mobile communications device 400 transmits the data structure request message to validation computer server 300 (and receives the data structure(s) from the validation computer server 300) when the mobile communications device 400 has connectivity with the mobile communications network.

(ii) Request Adjustment to Authorization Value

After the mobile communications device 400 receives the data structure(s), the customer may attend at the premises of the merchant (if the customer is not already at the premises of the merchant) and advises the merchant of its intention to purchase goods or services from the merchant. The customer also advises the merchant that the customer intends to pay the purchase price (in whole or in part) by providing the merchant with an adjustment request from the customer's mobile communications device 400. In response, at step S504 the merchant inputs a first authorization value (e.g. the purchase price) into the POS device 200 (for example, via the input device 202), and commands the POS device 200 to wait for an adjustment request from the mobile communications device 400.

The customer may then command the mobile communications device 400 to display on the display device 404 one or more of the data structures that are stored in the memory 414. The customer then uses the mobile communications device 400 to select one of the displayed data structures, and the mobile communications device 400 generates an adjustment request message that includes the user identifier and the selected data structure, and transmits the adjustment request message to the POS device 200 via the data-over-audio communications protocol of the local area network 150, at step S508.

In one variation, the merchant commands the POS device 200 to securely receive the adjustment request from the mobile communications device 400. In response, the POS device 200 may generate a token (for example, using a pseudo-random number generator), save the token in the memory 218 of the POS device 200, and transmit the token to the mobile communications device 400 via the data-over-audio communications protocol of the local area network 150, at step S506. The POS device 200 may also store the token in the memory 218 in association with a time-stamp of a current time. After the mobile communications device 400 receives the token from the POS device 200, the mobile communications device 400 generates an adjustment request message that includes the token, the user identifier and the selected data structure, and transmits the adjustment request message to the POS device 200 via the data-over-audio communications protocol of the local area network 150, at step S508.

After the POS device 200 receives the adjustment request message from the mobile communications device 200, the POS device 200 may proceed to validate the token (if the adjustment request message includes a token). The POS device 200 may validate the token by confirming that, before the POS device 200 received the token from the mobile communications device 400, the POS device 200 had saved the token in the memory 218. The POS device 200 may further validate the token by locating the time-stamp (if any) that is associated with the token in the memory 218, and confirming that a difference between the current time and the located time-stamp does not exceed a predetermined limit (i.e. confirming from the located time-stamp that the token has not expired).

If the POS device 200 successfully validates the token, the POS device 200 may then erase the token (and the associated time-stamp, if any) from the memory 218. However, if the POS device 200 is unable to successfully validate the token, the POS device 200 may generate an adjustment response message advising that the adjustment request was invalid, and may transmit the adjustment response message to the mobile communications device 400 via the data-over-audio communications protocol of the local area network 150.

If the POS device 200 successfully validates the token (or if the adjustment request message does not include a token), the POS device 200 extracts the user identifier and the selected data structure from the adjustment request message, generates a validation request message that includes the user identifier and the selected data structure, and transmits the validation request message to the validation computer server 300 via the wide area network 140, at step S510.

After the validation computer server 300 receives the validation request message from the POS device 200, the validation computer server 300 validates the validation request message by (i) locating the user profile that is associated with the customer by querying the user profile database 312 with the user identifier (included in the validation request message) to locate a database record that includes the user identifier, (ii) reading the data structure identifier from the selected data structure (included in the validation request message), and (iii) determining from the located user profile whether the data structure identifier of the selected data structure was previously saved in the user profile database 312 in association with the user identifier.

As discussed above, in one variation, the validation request message includes a merchant identifier. In this variation, the validation computer server 300 validates the validation request message by (i) locating the user profile that is associated with the customer by querying the user profile database 312 with the user identifier to locate a database record that includes the user identifier, (ii) reading the data structure identifier from the selected data structure, and (iii) determining from the located user profile whether the data structure identifier of the selected data structure was previously saved in the user profile database 312 in association with the user identifier and the merchant identifier.

In this variation, if the validation computer server 300 successfully validates the validation request message, the validation computer server 300 may also determine whether the user's profile includes a current balance value (merchant-specific current balance value) that is associated with the merchant. If the user's profile does not include a merchant-specific current balance value, the validation computer server 300 may establish in the user's profile a merchant-specific current balance value (initially set to zero).

If the validation computer server 300 successfully validates the validation request message, the validation computer server 300 generates a validation response message that indicates that, before the validation computer server 300 received the validation request message from the POS device 200, the validation computer server 300 had saved the data structure identifier in the user profile database 312 in association with the user identifier (and optionally the merchant identifier). Otherwise, the validation computer server 300 generates a validation response message that indicates that the validation computer server 300 had not previously saved the data structure identifier in the user profile database 312 in association with the user identifier (and optionally the merchant identifier).

As discussed above, in one variation, the validation response message includes the current balance value (or merchant-specific current balance value) that is saved in the user's profile in the user profile database 312 in association with the user identifier. Therefore, the validation computer server 300 may also determine the current balance value (merchant-specific current balance value) from the located user profile, and incorporate the current balance value (merchant-specific current balance value) into the validation response message.

After the validation computer server 300 generates the validation response message, the validation computer server 300 transmits the validation response message to the POS device 200 via the wide area network 140, at step S512.

After the POS device 200 receives the validation response message from the validation computer server 300, the POS device 200 determines from the validation response message whether the validation computer server 300 had validated the validation request message (i.e. the validation response message confirms that, before the validation computer server 300 received the validation request message, the validation computer server 300 had saved the data structure identifier in the user profile database 312 in association with the user identifier (and optionally the merchant identifier)).

If the POS device 200 determines that the validation computer server 300 had not validated the validation request message, the POS device 200 displays a suitable message on the display device 202, notifying the customer that the validation request message was not invalid. Otherwise, the POS device 200 recovers the adjustment value from the data structure saved in the memory 218 of the POS device 200, generates a second authorization value by subtracting the adjustment value from the first authorization value, displays a suitable message on the display device 202 that advises the customer of the second authorization value and prompts the customer to interface a payment card with the pin-pad terminal 208.

(iii) Generate Authorization Request

After the customer interfaces a payment card with the pin-pad terminal 208, the POS device 200 reads the account particulars (e.g. PAN, card expiration date) from the payment card (via the pin-pad terminal 208), and generates an authorization request message that includes at least the account particulars and the second authorization value. At step S514, the POS device 200 securely transmits the authorization request message to the acquirer computer server 500, and the acquirer computer server 500 relays the authorization request message to the authorization computer server 600 via the payment network of the wide area network 140.

After the authorization computer server 600 receives the authorization request message from the POS device 200, the authorization computer server 600 determines from the PAN specified in the authorization request message whether the transaction (in an amount equal to the second authorization value) can be authorized (i.e. determines from the ledger whether the credit available in the customer account associated with the PAN is at least equal to the second authorization value). If the authorization computer server 600 determines that the transaction can be authorized, the authorization computer server 600 reduces the credit available in the customer account by an amount equal to the second authorization value and generates an authorization response message indicating that the transaction was authorized. Otherwise, the authorization computer server 600 generates an authorization response message indicating that the transaction was declined.

After the authorization computer server 600 generates the authorization response message, at step S516 the authorization computer server 600 transmits the authorization response message to the acquirer computer server 500 via the payment network of the wide area network 140, and the acquirer computer server 500 securely transmits the authorization response message to the POS device 200.

After the POS device 200 receives the authorization response message from the authorization computer server 600, the POS device 200 determines from the authorization response message whether the transaction (in an amount equal to the second authorization value) was authorized. If the determines that the transaction was declined, the POS device 200 displays a suitable message on the display device 202, notifying the customer that the transaction was declined was declined.

Otherwise, the POS device 200 (i) generates an updated balance value by multiplying the second authorization value by a weight factor (e.g. included in the data structure saved in the memory 218 of the POS device 200) and adding the resulting product to the current balance value, and (ii) generates a balance update request that includes the user identifier and the updated balance value. if the validation request message included a merchant identifier (and, therefore, the validation response message includes the merchant-specific current balance value), the POS device 200 (i) generates an updated balance value by multiplying the second authorization value by the weight factor and adding the resulting product to the merchant-specific current balance value, and (ii) generates a balance update request that includes the merchant identifier, the user identifier and the updated balance value.

The POS device 200 then transmits the balance update request to the validation computer server 300 via the wide area network 140, at step S518.

After the validation computer server 300 receives the balance update request from the POS device 200, the validation computer server 300 locates the user profile that is associated with the user identifier by querying the user profile database 312 with the user identifier, replaces the current balance value (merchant-specific current balance value) in the user's profile with the updated balance value, and generates a balance update confirmation that confirms that the validation computer server 300 has replaced the current balance value (merchant-specific current balance value) in the user profile with the updated balance value. The validation computer server 300 then transmits the balance update confirmation to the POS device via the wide area network 140, at step S520.

After the POS device 200 receives the balance update confirmation from the validation computer server 300, the POS device 200 may transmit the updated balance value to the mobile communications device 400 via the data-over-audio communications protocol of the local area network 150, at step S522. In response, the mobile communications device 400 may display the updated balance value on the display device 402 of the mobile communications device 400.

The invention claimed is:

1. A validation server comprising:
a memory storing computer processing instructions; and
a processing unit coupled to the memory, wherein the processing instructions, when executed by the processing unit, cause the processing unit to:
receive a data structure request from a mobile communications device via a first communications network, the data structure request including a user identifier;
associate a data structure with a user profile, and transmit the data structure to the mobile communications device, the user profile being stored in a user profile database and including the user identifier and a current balance value;
receive a validation request from a point-of-sale device via a second communications network distinct from the first communications network, the validation request including the user identifier and the data structure, wherein the validation request is received via the point-of-sale device:
saving a token in a computer-readable memory of the point-of-sale device, and transmitting the token to the mobile communications device;
receiving an adjustment request from the mobile communications device via the second communications network, the adjustment request including the data structure and the token;
confirming that, prior to receiving the adjustment request, the point-of-sale device had saved the token in the computer-readable memory of the point-of-sale device; and
transmitting the validation request to the computer server;
validate the validation request by determining that, prior to receiving the validation request, the validation server had associated the data structure with the user profile;
receive a balance update request from the point-of-sale device via the second communications network, the balance update request including an updated balance value;
update the user profile by replacing the current balance value in the user profile with the updated balance value; and
transmit a balance update confirmation to the mobile communications device via the first communications network, the validation response confirming that the validation server had updated the user profile with the updated balance value.

2. The validation server according to claim 1, wherein the data structure request includes a merchant identifier, and the processing instructions cause the processing unit to associate the data structure with the user profile by:
generating a unique data structure identifier;
locating an e-coupon by querying an e-coupon database with the merchant identifier, the e-coupon storing the merchant identifier and an adjustment value;
determining the adjustment value from the located e-coupon;
incorporating the data structure identifier and the adjustment value into the data structure; and
saving the data structure identifier in the user profile database in association with the user identifier.

3. The validation server according to claim 2, wherein processing instructions cause the processing unit to:
associate the data structure with the user profile by saving the merchant identifier in the user profile database in association with the data structure identifier and the user identifier; and
validate the validation request by determining that, prior to receiving the validation request, the validation server had saved the merchant identifier and the data structure identifier in the user profile.

4. The validation server according to claim 1, wherein the processing instructions cause the processing unit to respond to the validation request by reading the current balance value from the user profile, and transmitting a validation response to the point-of-sale device, the validation response including the current balance value and confirming that the validation server had validated the validation request.

5. The validation server according to claim 1, wherein the second communications network includes the point-of-sale device and the mobile communications device, and a network requirement of a physical data transmission layer of the first communications network is incompatible with a network requirement of a physical data transmission layer of the second communications network.

6. The validation server according to claim 5, wherein the data structure includes an adjustment value, and the server receives the balance update request via the point-of-sale device:
recovering the adjustment value from the data structure;
generating the updated balance value from the current balance value and the adjustment value; and
Incorporating the updated balance value into the balance update request.

7. A method of updating a user profile, comprising:
a computer server receiving a data structure request from a mobile communications device via a first communications network, the data structure request including a user identifier;
the computer server associating a data structure with a user profile, and transmitting the data structure to the mobile communications device, the user profile being stored in a user profile database and including the user identifier and a current balance value;
the computer server receiving a validation request from a point-of-sale device via a second communications network distinct from the first communications network, the validation request including the user identifier and the data structure, wherein the receiving a validation request comprises the point-of-sale device:
saving a token in a computer-readable memory of the point-of-sale device, and transmitting the token to the mobile communications device;
receiving an adjustment request from the mobile communications device via the second communications network, the adjustment request including the data structure and the token;
confirming that, prior to receiving the adjustment request, the point-of-sale device had saved the token in the computer-readable memory of the point-of-sale device; and
transmitting the validation request to the computer server;
the computer server validating the validation request by determining that, prior to receiving the validation request, the computer server had associated the data structure with the user profile;
the computer server receiving a balance update request from the point-of-sale device via the second communications network, the balance update request including an updated balance value;
the computer server updating the user profile by replacing the current balance value in the user profile with the updated balance value; and
the computer server transmitting a balance update confirmation to the mobile communications device via the first communications network, the validation response confirming that the computer server had updated the user profile with the updated balance value.

8. The method according to claim 7, wherein the data structure request includes a merchant identifier, and the associating a data structure with the user profile comprises:
the computer server generating a unique data structure identifier;
the computer server locating an e-coupon by querying an e-coupon database with the merchant identifier, the e-coupon storing the merchant identifier and an adjustment value;
the computer server determining the adjustment value from the located e-coupon;
the computer server incorporating the data structure identifier and the adjustment value into the data structure; and
the computer server saving the data structure identifier in the user profile database in association with the user identifier.

9. The method according to claim 8, wherein:
the associating a data structure with the user profile further comprises the computer server saving the merchant identifier in the user profile database in association with the data structure identifier and the user identifier; and
the validating the validation request comprises determining that, prior to receiving the validation request, the computer server had saved the merchant identifier and the data structure identifier in the user profile.

10. The method according to claim 7, further comprising the computer server responding to the validation request by reading the current balance value from the user profile, and transmitting a validation response to the point-of-sale device, the validation response including the current balance value and confirming that the computer server had validated the validation request.

11. The method according to claim 7, wherein the second communications network includes the point-of-sale device and the mobile communications device, and a network requirement of a physical data transmission layer of the first communications network is incompatible with a network requirement of a physical data transmission layer of the second communications network.

12. The method according to claim 11, wherein the data structure includes an adjustment value, and the receiving a balance update request comprises the point-of-sale device:
recovering the adjustment value from the data structure;
generating the updated balance value from the current balance value and the adjustment value; and
incorporating the undated balance value into the balance update request.

13. A non-transitory computer-readable medium including computer processing instructions stored thereon which, when executed by a processor of a computer server, cause the computer server to:
receive a data structure request from a mobile communications device via a first communications network, the data structure request including a user identifier;
associate a data structure with a user profile, and transmit the data structure to the mobile communications device, the user profile being stored in a user profile database and including the user identifier and a current balance value;
receive a validation request from a point-of-sale device via a second communications network distinct from the first communications network, the validation request including the user identifier and the data structure, wherein the validation request is received via the point-of-sale device:
saving a token in a commuter-readable memory of the point-of-sale device, and transmitting the token to the mobile communications device;
receiving an adjustment request from the mobile communications device via the second communications network, the adjustment request including the data structure and the token;
confirming that, prior to receiving the adjustment request, the point-of-sale device had saved the token in the computer-readable memory of the point-of-sale device; and transmitting the validation request to the computer server;

validate the validation request by determining that, prior to receiving the validation request, the computer server had associated the data structure with the user profile;

receive a balance update request from the point-of-sale device via the second communications network, the balance update request including an updated balance value;

update the user profile by replacing the current balance value in the user profile with the updated balance value; and transmit a balance update confirmation to the mobile communications device via the first communications network, the validation response confirming that the computer server had updated the user profile with the updated balance value.

14. The computer-readable medium according to claim 13, wherein the data structure request includes a merchant identifier, and the processing instructions cause the computer server to associate the data structure with the user profile by:

generating a unique data structure identifier;

locating an e-coupon by querying an e-coupon database with the merchant identifier, the e-coupon storing the merchant identifier and an adjustment value;

determining the adjustment value from the located e-coupon;

incorporating the data structure identifier and the adjustment value into the data structure; and saving the data structure identifier in the user profile database in association with the user identifier.

15. The computer-readable medium according to claim 14, wherein the processing instructions cause the computer server to:

associate a data structure with the user profile by saving the merchant identifier in the user profile database in association with the data structure identifier and the user identifier; and validate the validation request by determining that, prior to receiving the validation request, the computer server had saved the merchant identifier and the data structure identifier in the user profile.

16. The computer-readable medium according to claim 13, wherein the processing instructions cause the computer server to respond to the validation request by reading the current balance value from the user profile, and transmitting a validation response to the point-of-sale device, the validation response including the current balance value and confirming that the computer server had validated the validation request.

17. The computer-readable medium according to claim 13, wherein the second communications network includes the point-of-sale device and the mobile communications device, and a network requirement of a physical data transmission layer of the first communications network is incompatible with a network requirement of a physical data transmission layer of the second communications network.

18. The validation server according to claim 6, wherein the point-of-sale device includes an input device, and the generating the updated balance value comprises the point-of-sale device:

receiving a first authorization value from the input device;

generating a second authorization value from a difference between the first authorization value and the adjustment value;

generating the updated balance value from the second authorization value and the current balance value; and transmitting an authorization request message to an authorization server over a payment network, the authorization request message including the second authorization value.

19. The method according to claim 12, wherein the point-of-sale device includes an input device, and the generating the updated balance value comprises the point-of-sale device:

receiving a first authorization value from the input device;

generating a second authorization value from a difference between the first authorization value and the adjustment value;

generating the updated balance value from the second authorization value and the current balance value; and transmitting an authorization request message to an authorization server over a payment network, the authorization request message including the second authorization value.

20. The computer-readable medium according to claim 17, wherein the data structure includes an adjustment value, and the server receives the balance update request via the point-of-sale device:

recovering the adjustment value from the data structure;

generating the updated balance value from the current balance value and the adjustment value; and incorporating the updated balance value into the balance update request.

* * * * *